Oct. 25, 1966 L. J. BROWELL ETAL 3,281,540

AUTOMATIC TELEPHONE SYSTEMS

Filed June 26, 1963

9 Sheets-Sheet 1

INVENTORS
LESLIE JAMES BROWELL
ALAN BRADLEY.
BY Irwin S. Thompson
ATTY.

AUTOMATIC TELEPHONE SYSTEMS

Filed June 26, 1963

INVENTORS.
LESLIE JAMES BROWELL.
ALAN BRADLEY.
BY Irwin S. Thompson
ATTY.

INVENTORS.
LESLIE JAMES BROWELL.
ALAN BRADLEY.
BY Irwin S. Thompson
ATTY.

INVENTORS
LESLIE JAMES BROWELL.
ALAN BRADLEY.
BY [signature]
ATTY.

INVENTORS.
LESLIE JAMES BROWELL.
ALAN BRADLEY.
BY Irwin A. Thompson
ATTY.

Oct. 25, 1966 L. J. BROWELL ETAL 3,281,540

AUTOMATIC TELEPHONE SYSTEMS

Filed June 26, 1963 9 Sheets-Sheet 6

INVENTOR:
LESLIE JAMES BROWELL
ALAN BRADLEY
BY Irwin S. Thompson
ATT

INVENTORS.
LESLIE JAMES BROWELL.
ALAN BRADLEY.
BY Irwin S. Thompson

AUTOMATIC TELEPHONE SYSTEMS

Filed June 26, 1963

INVENTORS.
LESLIE JAMES BROWELL.
ALAN BRADLEY.
BY Irwin S. Thompson
ATTY.

INVENTORS
LESLIE JAMES BROWELL.
ALAN BRADLEY.
BY
Irwin S. Thompson
ATTY.

United States Patent Office 3,281,540

Patented Oct. 25, 1966

3,281,540

AUTOMATIC TELEPHONE SYSTEMS

Leslie James Browell, Heswall, and Alan Bradley, Huyton, England, assignors to Automatic Telephone & Electric Company Limited, Liverpool, England, a British company Filed June 26, 1963, Ser. No. 290,749
Claims priority, application Great Britain, July 5, 1962, 25,800/62
2 Claims. (Cl. 179—22)

Figure 1:
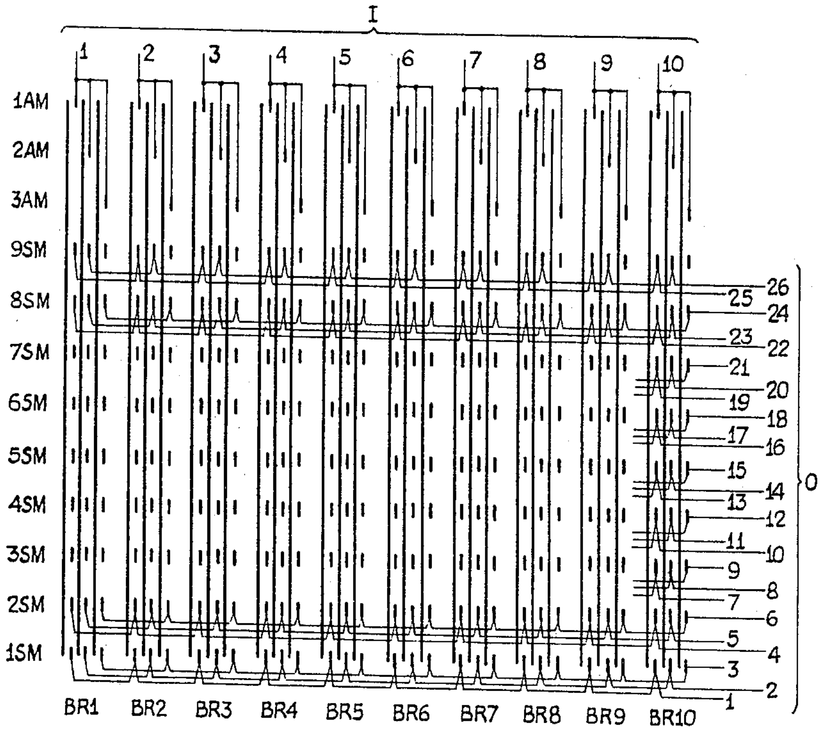

The present invention relates to improvements in automatic telephone systems employing crossbar switches and is more particularly concerned with arrangements for controlling the crossbar switches.

In many known crossbar switch systems, the control of the crossbar switches is effected by the use of highly centralised and complex common control equipment. A crossbar-type telephone system is known, which by employing the so-called self-steering principle, avoids the use of such common control equipment.

The self-steering principle enables two multiconductor points to be connected together over a plurality of crossbar switching stages by initially marking available paths through the switching stages from one of said points in the direction of the other point. Concurrently with the marking function, preparatory switching operations relevant to the paths are performed within all the crossbar switches involved, and subsequently, one of the available paths is chosen, and a signal is transmitted from the second point, the signal being effective in completing the switching operation in one of the prepared switches in each stage successively.

Patent No. 3,115,553 discloses an automatic telephone exchange system of the crossbar type which will serve from a few hundred to several thousand subscribers and which also employs the self-steering principle, although in an improved form.

The present invention has for its main object the provision of simplified arrangements for controlling the operation of the crossbar switches in an automatic telephone exchange system of the type described in the last-mentioned specification, thus leading to greater economy in the system as a whole.

According to one aspect of the invention, circuit arrangements for use in conjunction with two successive stages of crossbar selectors with each stage containing a plurality of selectors each of which has a plurality of inlets and plurality of outlets and the outlets of the first-stage selectors are link-connected to individual inlets of the second-stage selectors to provide at least one link between each first stage selector and each one of the second-stage selectors are characterised in that relay means are provided for each first-stage selector, contacts of said relay means, when operated, preparing possible operating paths for selecting magnets of the particular first-stage selector which are relevant to links to the second-stage selectors, other contacts of said relay means extending connections individually from marking leads, of those inlets of second-stage selectors which are linked to outlets of that first-stage selector associated with the operated relay means, to separate ones of a set of relays arranged for effective operation on a mutually exclusive basis depending on conditions appertaining at said marking leads each relay of said set being concerned with a particular corresponding outlet of every first-stage selector, any operated relay of the set serving to advance operating conditions toward selecting magnets of all first-stage selectors to enable the selecting magnets of that particular first-stage selector having an operated relay means to be so-controlled as to perform a preparatory switching operation within the latter selector to determine which link is to be employed.

According to another aspect of the invention, circuit arrangements for use in conjunction with two successive stages of crossbar selectors of which the first-stage selectors each having speech-path relay sets separately connected to its inlets, are arranged in a plurality of pairs with corresponding outlets of the selectors of each pair connected together to provide common outlets which are divided into two groups, and of which the second-stage selectors are divided into two groups, the first group of common outlets of each pair of first-stage selectors being link-connected to individual inlets of the first group of second-stage selectors such as to provide at least one link between each pair of first-stage selectors and each one of said first group of second-stage selectors, the second group of common outlets of each pair of first-stage selectors being likewise link-connected to individual inlets of the second group of second-stage selectors, are characterised in that each first selector has first and second discriminating relays individual to it and mutually-exclusively operable according to whether a connection is required to be set up from a speech-path relay set by way of any second-stage selector of said first group or said second group respectively, contacts of said first relay, when operated, preparing possible operating paths for those selecting magnets of the particular first-stage selector which are relevant to links terminating on second-stage selectors of the first group, whereas contacts of said second relay, when operated, prepare possible operating paths for those selecting magnets of the particular first-stage selector which are relevant to links terminating on second-stage selectors of the second group, the circuit arrangements also including an additional pair of relays for each pair of first selectors, the first relay of each additional pair being adapted to be operated upon operation of either of the first discriminating relays of the related pair of first selectors whereas the second relay of each additional pair is adapted to be operated upon operation of either of the second discriminating relays of the related pair of first selectors, the circuit arrangements moreover including first and second sets of relays, those of each set being arranged for effective operation on a mutually exclusive basis, the relays of the first set being individually concerned with those common outlets of all pairs of first selectors which are linked to inlets of the first group of second-stage selectors whereas the relays of the second set are individually concerned with those common outlets of all pairs of first selectors which are linked to inlets of the second group of second-stage selectors, any first relay of each said additional pairs of relays, upon operation, being adapted to prepare possible operate paths for individual relays of the first set from marking leads of the particular inlets, of the first group of second selectors, which are linked to the first group of common outlets of that pair of first-stage selectors associated with the operated first relay whereas any second relay of each said additional pair of relays is, upon operation, adapted to prepare possible paths for individual relays of the second set from marking leads of the particular inlets, of the second group of second selectors, which are linked to the second group of common outlets of that pair of first-stage selectors associated with the operated second relay, any operated relay of the first or second set serving to advance operating conditions towards selecting magnets of the first or second groups of outlets respectively of all first-stage selectors to enable the selecting magnets in that individual first-stage selector having an operated discriminating relay to be so controlled as to perform a preparatory switching operation within the latter selector to determine which link is to be employed.

The invention will be more readily understood from the following description of the preferred method of carrying it into effect, which should be read in conjunction with the accompanying drawings.

Figure 2:
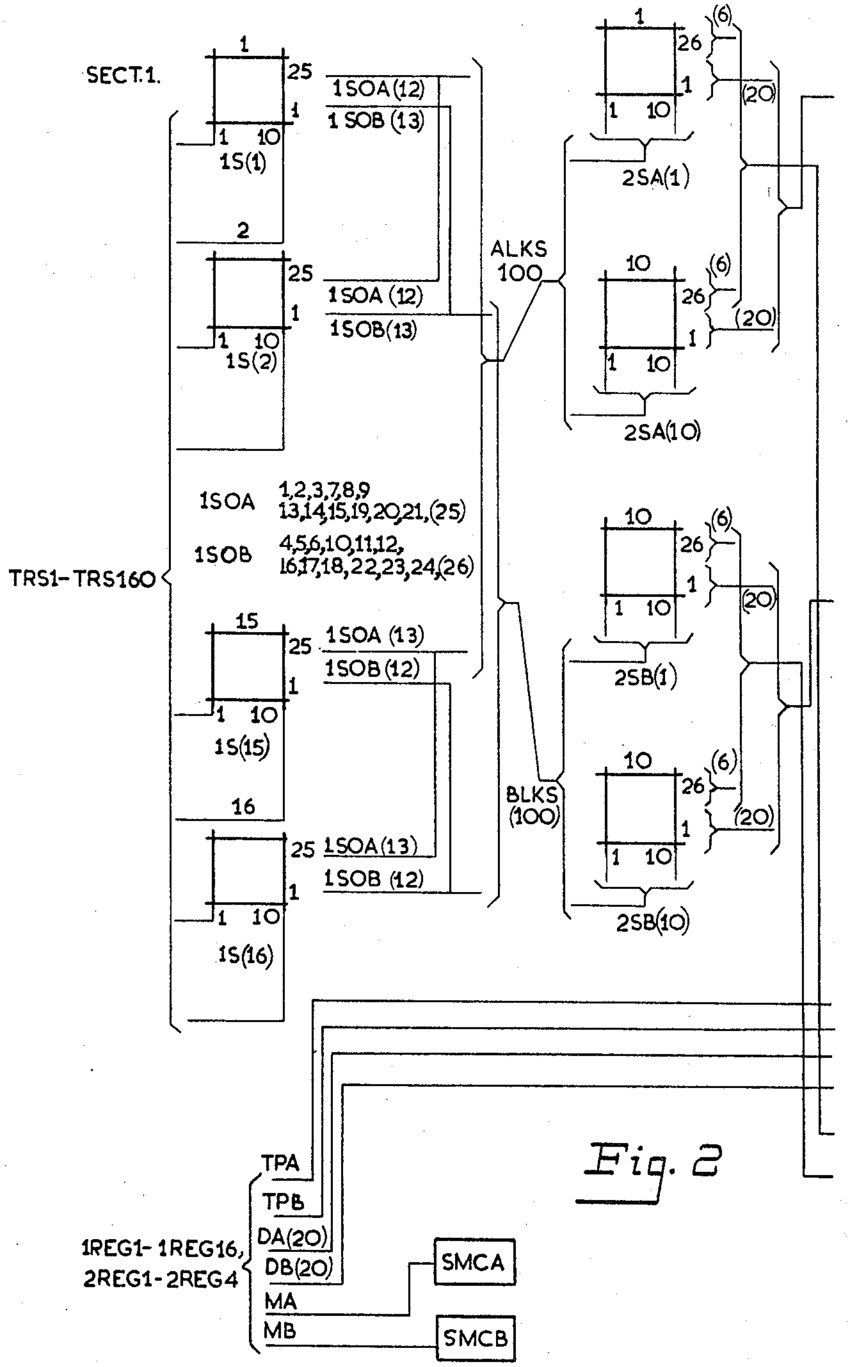
Figure 3:
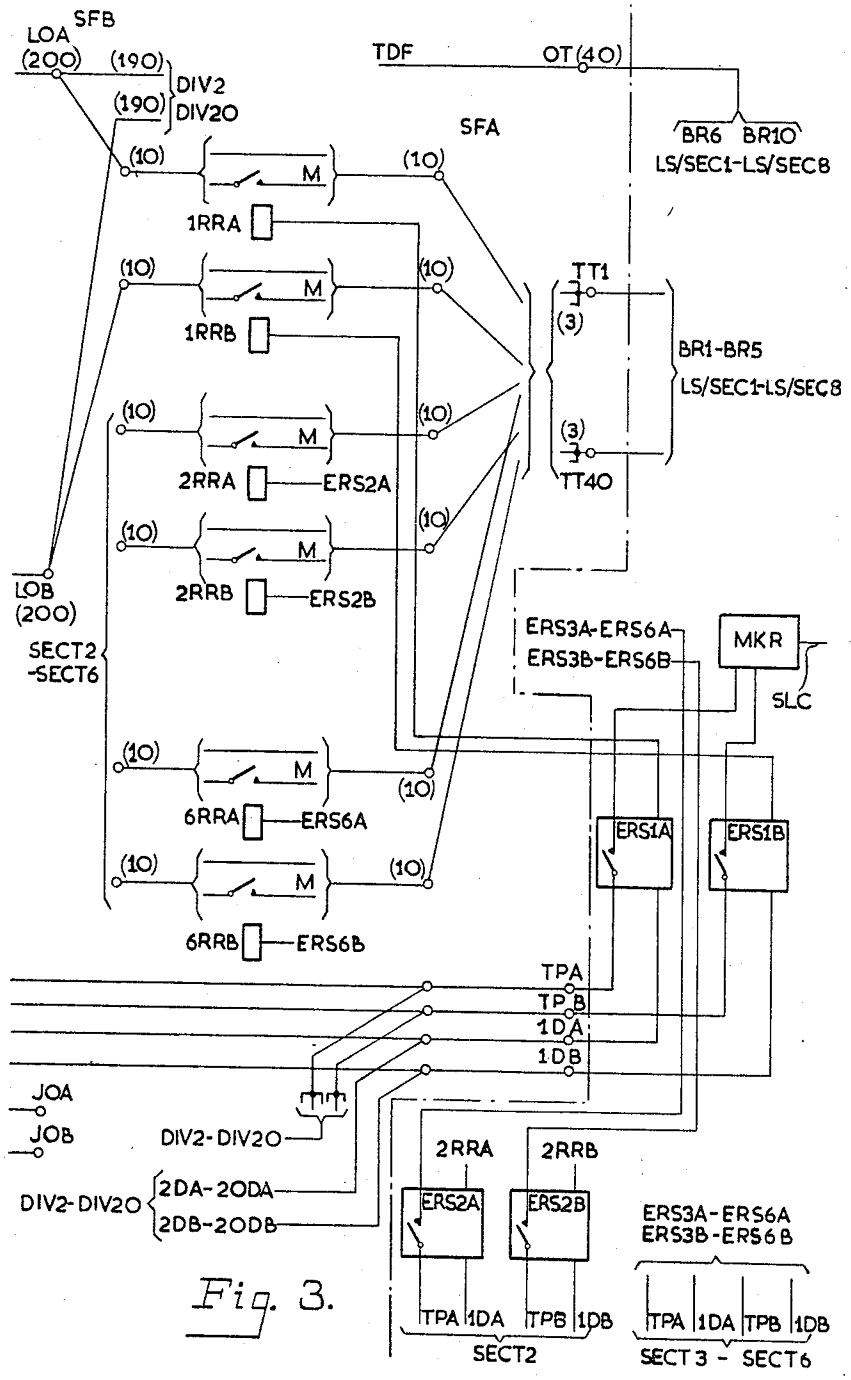
Figure 10:
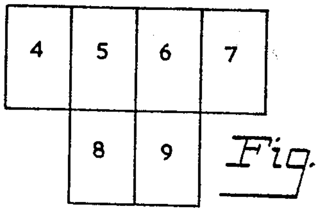
Figure 8:
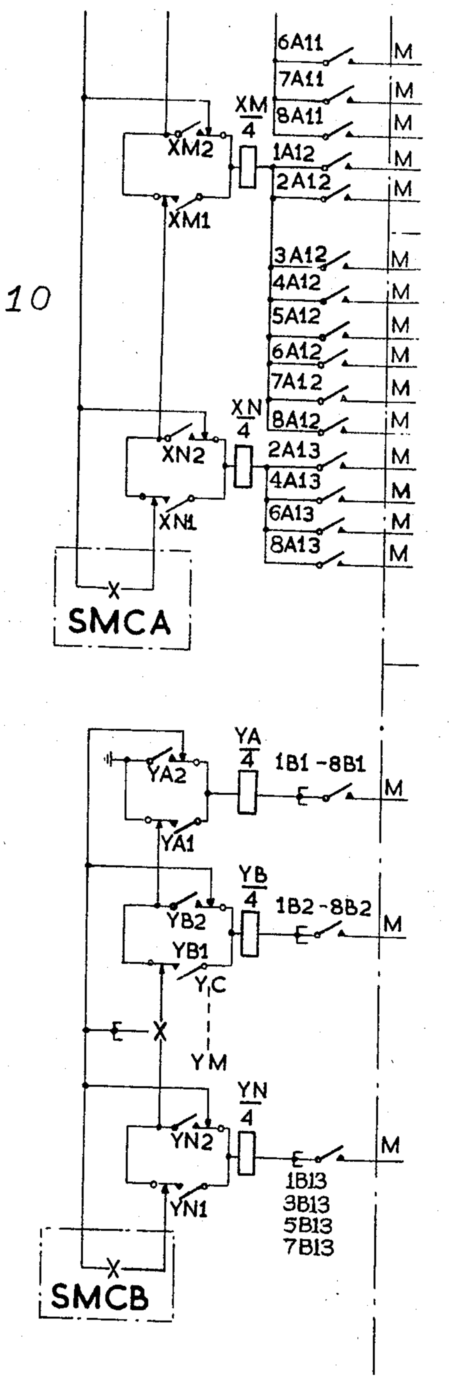

Of the drawings:

FIG. 1 shows in outline a crossbar switch arranged for triple-group working,

FIGS. 2 and 3 which should be placed side by side in that order, show a portion of the trunking diagram appertaining to a typical 10,000 line automatic telephone exchange as described fully in Patent No. 3,115,553, and FIGS. 4 to 9, which should be arranged as shown in FIG. 10, show the circuit for a trunk section and controlling arrangements therefor, according to the invention.

*Crossbar switches of the selecting stages*

In the portion of the automatic telephone exchange to be described, the selectors in the main selecting stages involve crossbar switches of the 12 x 10 type i.e. having twelve select magnets and ten bridge magnets. It is also important to understand that each switch is arranged for what may be termed triple-group working. This method is illustrated in FIG. 1 of the accompanying drawings and, briefly, ten inlets I1 to I10 of each switch have access to as many as 26 outlets, O1 to O26, individually. Ten bridges BR1 to BR10 are represented vertically, and the positions of references 1SM to 9SM are indicative of the effective positions of the nine select magnets and crosspoints in each bridge. Likewise, the references 1AM to 3AM correspond to the effective positions of auxiliary select magnets with respect to other crosspoints in each bridge. The 26 outlets of a crossbar switch, when arranged for triple-group working, are associated with the crosspoints of select magnets 1SM to 9SM as follows:

| | | | | | | | | | |
|---|---|---|---|---|---|---|---|---|---|
| Outlet | 1<br>2<br>3 | 4<br>5<br>6 | 7<br>8<br>9 | 10<br>11<br>12 | 13<br>14<br>15 | 16<br>17<br>18 | 19<br>20<br>21 | 22<br>23<br>24 | 25<br>26 |
| Select magnets | 1SM | 2SM | 3SM | 4SM | 5SM | 6SM | 7SM | 8SM | 9SM |

The 26 outlets are multiplied throughout the 10 bridges.

The ten inlets I1 to I10 are associated with bridges BR1 to BR10 respectively and are each connected to contact points relevant to crosspoints controlled by the auxiliary magnets 1AM to 3AM. It will thus be seen that the switch outlets are related by the bridge commons to the crosspoints of the various auxiliary magnets in the following manner:

| | | | | | | | | | | | | | | |
|---|---|---|---|---|---|---|---|---|---|---|---|---|---|---|
| Outlets | 1<br>13 | 4<br>16 | 7<br>19 | 10<br>22 | 25 | 2<br>14 | 5<br>17 | 8<br>20 | 11<br>23 | 26 | 3<br>15 | 6<br>18 | 9<br>21 | 12<br>24 |
| Auxiliary magnets | 1AM | | | | | 2AM | | | | | 3AM | | | |

In the conventional switch, auxiliary and select magnets are operated first, and subsequently the bridge magnet, the action of which actuates the crosspoints associated with the operated auxiliary and select magnets. The switch would be controlled further so that the auxiliary and select magnets are released immediately as a connection has been set up, whereupon the connection is maintained solely by the operated bridge magnet.

It will be appreciated that although the actual setting-up of connections through the switch must proceed at a one-at-a-time basis, each of the ten bridges may be occupied in respect of individual through connections, i.e. calls fully connected enabling speech transmission.

To assist in understanding the arrangement of the switch, the method of establishing a connection between inlet I4 and outlet O10 will be outlined. Firstly auxiliary magnet 1AM and select magnet 4SM are operated and subsequently the bridge magnet of bridge BR4 is operated. The latter in conjunction with magnet 4SM connects outlets O10, O11 and O12 to the three groups of bridge commons in bridge BR4, whereas the same bridge magnet in conjunction with auxiliary magnet 1AM connects inlets I4 to the particular group of bridge commons to which outlet O10 is connected.

*General description of exchange*

The portion of the exchange concerned with the invention will be described briefly with reference to FIGS. 2 and 3. This portion of the exchange is similar to the corresponding portion of the 10,000 line exchange such as described in Patent No. 3,115,553 with reference to FIGS. 2 to 5 therein.

*The division*

There are twenty divisions, one of which designated DIV1, is partly shown in the diagram. Each division serves 500 subscribers, which are connected by way of subscribers' line circuits to the outlets of twenty line selector primary switches LS/PRI. The inlets of the line-selector primary LS/PRI switches are directed to the outlets of eight line-selector secondary switches LS/SEC.

The inlets of the eight secondary switches are connected to a strapping field SFA and are divided into two groups. Inlets involving bridges BR1 to BR5 are termed terminating trunks and are concerned with calls incoming to subscribers of the division, whereas inlets involving bridges BR6 to BR10 are termed originating trunks which are concerned with calls originated by subscribers of the division. Only the strapping field SFA is shown since the remaining aforementioned trunking does not directly concern the present invention.

Each division contains a marker MKR and associated pairs of entry relay sets ERS1A and ERS1B, ERS2A and ERS2B and so on for each trunk section of the exchange, each pair having access to the marker. The marker MKR has 500 marking wires emanating from it which are individually connected to the corresponding conductors at the numerical side of the line intermediate distribution frame, whence they are extended to individual line circuits.

*The trunk sections*

The number of so-called trunk sections is determined by traffic requirements, and in the present case it may be assumed that six are provided, one of which, designated SECT1, is represented in the trunking diagram.

Each trunk section has first and second crossbar selectors, transmission relay groups, first and second choice registers, two section marking controls, and register allotters. All the aforementioned equipments constitute the intermediate portion of the exchange from the point of view of switching, all the sections being accessible from and giving access to every 500-line division.

In the trunking diagram the registers, transmission relay groups, and register allotters are not shown, since they do not directly concern the present invention but they will be described briefly.

Transmission relay groups are connected directly to the inlets of first selectors 1S1 to 1S16 and since each switch has ten inlets, 160 transmission relay sets are provided, designated TRS1 to TRS160. These transmission relay sets are allocated as required for locally originated calls and for other calls of various kinds. The calling sides of the relay sets are connected by individual trunks to the trunk distribution frame (not shown), where all originating trunks from each division are terminated, together with incoming junctions from automatic, manual and trunk exchanges. The outgoing sides of the relay sets are terminated on the first selectors, each relay set being associated with one inlet.

There are sixteen first-choice registers 1REG1 to 1REG16 and four second-choice registers 2REG1 to 2REG4 both types being arranged to store dialled digits in any convenient manner. The registers are accessible from the transmission relay sets. Sixteen register allotters RA1 to RA16 are provided, their principle function being to control the access paths of the first and second choice registers.

The first and second selectors each incorporate a crossbar switch together with its necessary control relays, the crossbar switch being arranged in the manner described for triple-group working. Again, although the switch is adapted for the through switching of —, + and P wires, the inlets and outlets involve one or more other conductors for control purposes, for example, the M wire for marking conditions.

The ten inlets of all the first and second selectors are available whereas only 25 outlets of the possible 26 are used in the case of the first selectors.

With regard to the first selectors, it may be seen that they are arranged in pairs 1S1 and 1S2, 1S3 and 1S4 . . . 1S15 and 1S16, and the outlets of the selectors of each particular pair are multipled so that 25 outlets are derived from the two selectors together. These are divided into what may be called "A" outlets and "B" outlets and are designated 1SOA and 1SOB in the trunking diagram. It will be recalled that the selector crossbar switches cater for 26 outlets, but in the case of first selectors only 25 are used. More particularly if we consider the pairs of selectors as numbering 1 to 8 downwardly, outlet number 26 of the odd pairs and outlet number 25 of the even pairs are not used. Considering selectors 1S1 and 1S2, which are typical of the odd pairs, the twelve outlets 1, 2, 3, 7, 8, 9, 13, 14, 15, 19, 20 and 21 are multiplied and constitute "A" outlets, whereas the thirteen outlets 4, 5, 6, 10, 11, 12, 16, 17, 18, 22, 23, 24 and 26 are also multiplied together and constitute the "B" outlets. On the other hand as regards the even pairs of selectors, such as selectors 1S15 and 1S16, the multiplied outlet number 25 makes an additional "A" outlet whereas the "B" outlets are reduced to twelve by the omission of outlet number 26.

It will be seen that 100 "A" outlets (1SOA) and 100 "B" outlets (1SOB) are derived from the rank of first selectors, the "A" outlets extending over links ALKS being terminated on the 100 inlets of the ten second selectors 2SA, while the "B" outlets extend to the 100 inlets of the ten selectors 2SB. The distribution of the first selector outlets is such that each first selector and therefore the relevant ten transmission relay sets, has access to every second selector over one link and in some cases over two links.

The second selectors 2SA1 and 2SA10 provide outlets to a total of 260 trunks, and the selectors 2SB1 to 2SB10 have a similar outlet capacity. Of each of the outlet groups, 200 designated LOA and LOB are available for locally terminated calls and 60 designated JOA and JOB are available for outgoing junction calls. The individual transmission relay sets have access to all 520 secondary selector outlets.

The provision of "A" and "B" outlets at the first selectors, and the connection of those outlets over "A" and "B" links (ALKS and BLKS) respectively to different groups of second selectors each giving access to a different group of local (LOA or LOB) and outgoing junction (JOA or JOB) outlets, in effect divides the section into two sub-sections, and it may be convenient to refer to that embracing second selectors 2SA as sub-section A, and to that embracing second selectors 2SB as sub-section B. The particular sub-section to be used in the setting up of a connection from a transmission relay set to a wanted local subscriber or to an outgoing junction, is determined by a discriminating condition applied to the first selector.

The trunking section also includes two section marking control circuits SMCA and SMCB which are concerned with sub-sections A and B respectively. Both of these circuits are accessible from all registers of the section and when any register has received all the digits necessary for the completion of a call, either for local termination or outgoing, it in effect applies to both section marking control circuits for permission for the call to proceed. If neither of the control circuits are in use when a register institutes a demand, either one of them may be seized by way of leads MA or MB and give the necessary permission, whereas if either one of them is busy the other becomes operative, but if both are busy the register will wait until a control circuit becomes idle.

The granting of permission for a call to proceed by section marking control circuit SMCA, decides that sub-section "A" is to be used for the call, and likewise section marking control circuit SMCB determines that sub-section "B" is to be used.

The registers of the typical section are concerned with controlling the 500 line marker of any division by way of the two multi-conductor transfer paths, TPA and TPB. The first path is appropriate to calls to be routed over sub-section "A," and the second path is used for calls over sub-section "B." The two transfer paths (25 conductors each) of the section are directed to all twenty 500-line divisions DIV1 to DIV20, and the pair of digit transfer paths TPA and TPB from each of the six sections is terminated in each division. Each division is provided with pairs of marker entry relay sets (ERS1A, ERS1B . . . ERS6A, ERS6B), a pair being allocated for each section.

Two other groups of conductors DA and DB (20 conductors each), also concerned with local calls using sub-sections "A" and "B" respectively, are commoned to all the registers of the section, there being one conductor of each group connected to each division. It may be mentioned briefly that the marking of one of the twenty DA or DB conductors by a register, effectively chooses the 500-line group of the wanted subscriber, i.e. the particular division, whereas the energisation of three conductors (hundred, ten and unit digits) of the relevant 25-conductor transfer path TPA or TPB defines an individual subscriber in the division.

It is important to note that if a sub-section "A" is to be involved in a call, one of the DA conductors and transfer path TPA are used for defining a called subscriber, but if a call is to utilise sub-section "B" a DB conductor and transfer path TPB will be employed. This arrangement enables the section to institute the marking of a subscriber's line circuit in each of two different divisions concurrently, and moreover setting-up of connections from those line circuits to the transmission relay sets concerned may also proceed and be completed concurrently over the separate sub-sections without mutual interference.

*Terminating trunks*

It will be recalled that each section has 520 second-selector outlets and of those 400 are to give access to terminating trunks of all twenty divisions for the purpose of completing calls to subscribers of the exchange. Of the second selector local outlets, 200 collectively designated LOA and 200 designated LOB are obtained from sub-sections "A" and "B" respectively. Ten LOA and ten LOB outlets from each of the six sections SECT1 to SECT6, making a total of 120 and extending over strapping fields SFB and SFA are connected to the 40 terminating trunks TT1 to TT40 of the typical division, so that each terminating trunk is connected to three second selector outlets.

The links between second selector outlets and terminating trunks embrace four conductors of which three, namely, —, + and P conductors, are continuous whereas the fourth, which is a marking wire M, is normally broken by a "make" contact of a route marking relay 1RRA, 1RRB . . . 6RRA, 6RRB. It should be noted that these relays have the same function as the so-called terminating trunk relays, designated TTMA in Patent No. 3,115,553. Each such route marking relay has ten contacts one of which is shown for simplicity, and the prefix digit of the relay designation is indicative of the section to which it is related whereas the suffix letter A or B is indicative of the relevant sub-section. Thus the ten contacts of relay 1RRA, when operated, would complete the marking paths of the ten links between sub-section "A" of section SECT1 and ten terminating trunks of division DIV1, and likewise relay 1RRB is concerned with the completion of the marking paths of the ten links between sub-section "B" of section SECT1 and the same division. The remaining five pairs of relays are related to other sections and the same division in a similar manner.

It will be appreciated that a group of six pairs of route marking relays, such as those represented in the drawings, are provided for each 500-line division. Each of the twelve marker entry relay sets ERS1A to ERS6B of a division is arranged to control the operation of an individual route marking relay. Thus for example, if a caller, who has takeen into use a transmission relay set in section SECT1, requires connection to a subscriber served by division DIV1, and it has been established that the connection is to be completed over sub-section "A," relay set ERS1A is used to gain access to the divisional marker, and that relay set determines that relay 1RRA shall operate. Since only one entry relay set of the particular division can be operative at any one time, it follows that only one route marking relay relevant to that division can be operated, relay 1RRA being operated in the present case. Therefore the marking (M) paths of the links between the calling sub-section and the required division are completed, and the effect of this is to enable a connection to be set-up between the calling transmission relay set and the wanted subscriber over an idle one of the available links.

The provision of pairs of route marking relays between each trunking section and each 500-line division effectively completes the separation of each section into its two sub-sections. As a result of this it becomes more evident that it will be possible for each section to handle the setting-up of two calls to subscribers in different divisions simultaneously.

*Originating trunks*

As already mentioned, each subscriber's division has 40 originating trunks which enable a subscriber to be connected to a transmission relay set in any section when he originates a call. The 40 originating trunks of each division are terminated upon a trunk distribution frame (not shown) and each group of 40 is distributed as equally as possible by jumpering to all the sections. A call originating in any one of the twenty divisions DIV1 to DIV20 might well be terminated on a transmission relay set in any one of the six trunking sections SECT1 to SECT6.

*Circuit description*

The operation of the arrangements for controlling the crossbar switch selectors will now be described with reference to FIGS. 4 to 9.

It will be seen that three conductors, —, + and P, extend through the top of FIGS. 4 to 7, and are each discontinuous by inclusion (diagrammatically) of a cross in the first selector 1S1, second selector 2SA1, and line-selector secondary LS/SEC1. The cross represents the crosspoints which would be associated with each conductor, and the designations I and T are indicative of the inlets and outlets respectively. It will be appreciated that although only three conductors are shown, there would be ten inlets and up to 26 outlets, although in some cases only 25 outlets are utilised.

The circuitry shown directly below the three wires —, +, and P, is concerned with the control arrangements operated by any of the marking wires M associated with the links between switching stages.

Figure 4:
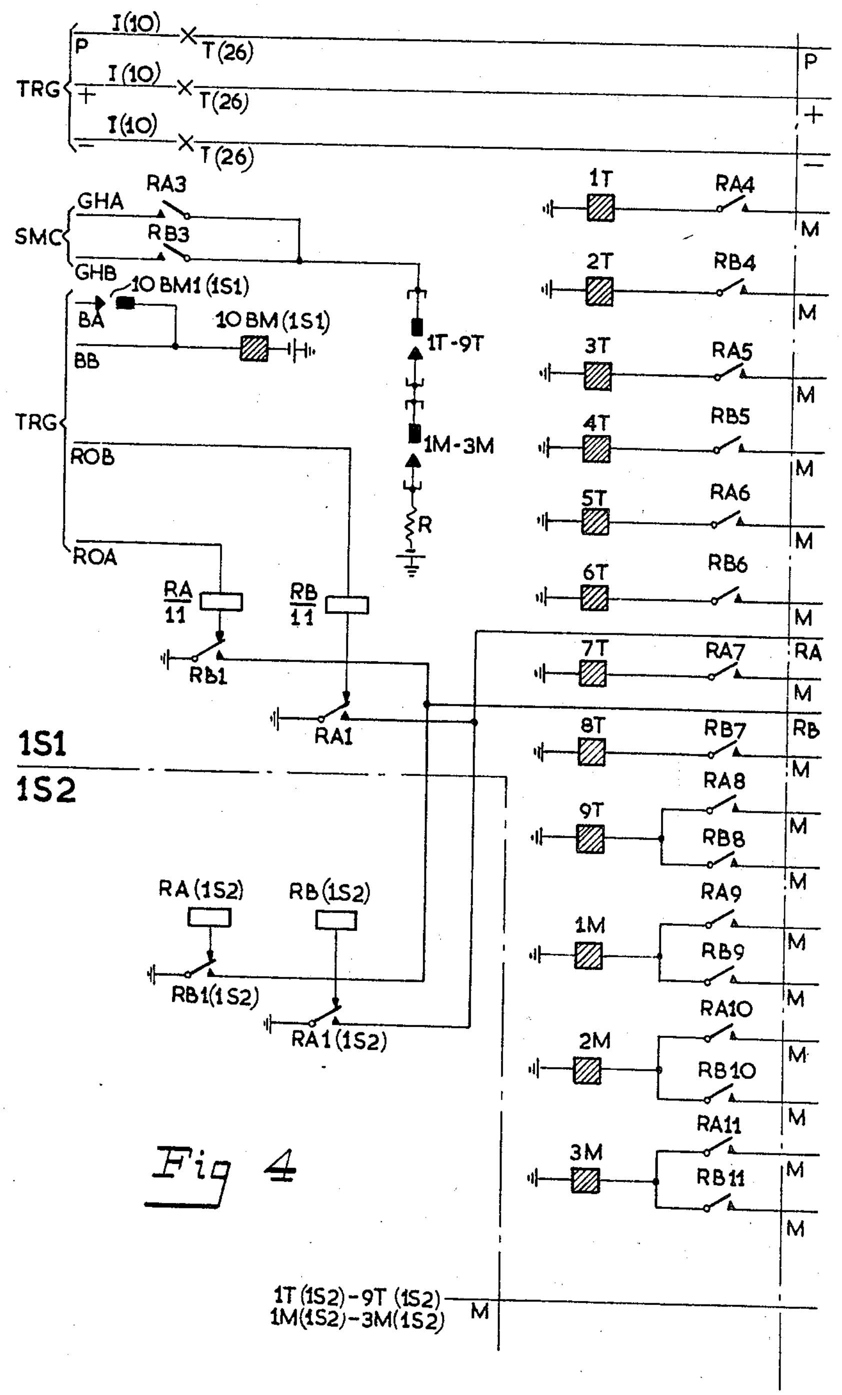
Figure 5:
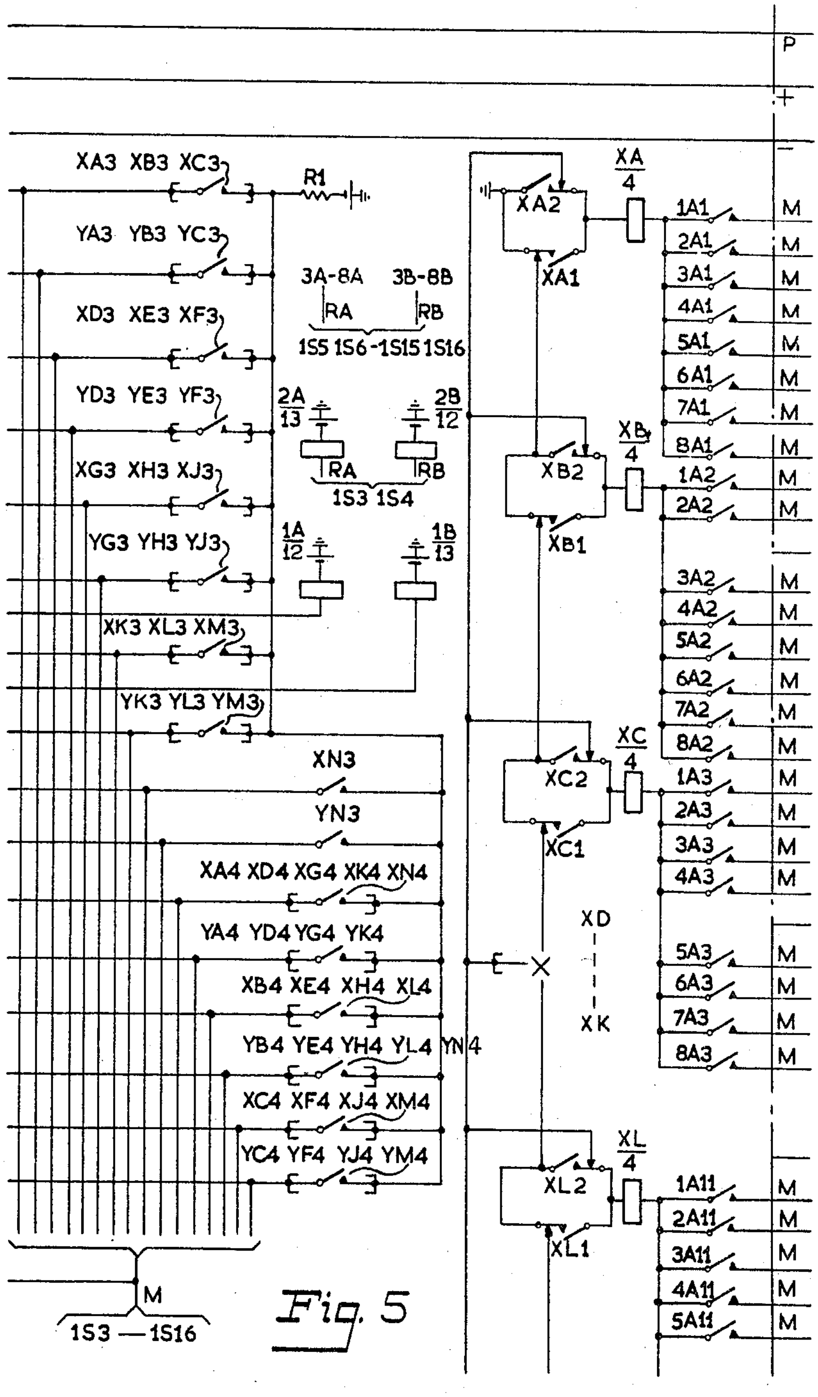

In FIG. 4 is shown part of the circuits appertaining to a pair of first selectors designated 1S1 and 1S2, each selector having a pair of relays RA and RB. Either RA or RB relay is operative from a battery discriminating signal received from the section marking control, by way of the register and transmission relay set, when one of the two section marking cntrols SMCA or SMCB grants permission for a call to proceed by way of the relevant sub-section "A" or "B" respectively. Accordingly relay RA operates in the case of a sub-section "A" call or relay RB operates for a sub-section "B" call.

Eight pairs of relays 1A and 1B . . . 8A and 8B are provided, one pair for each pair of first selectors. Considering the first pair of first selectors 1S1 and 1S2, contacts RA1 of relay RA are assocated with relay 1A, and contacts RB1 are associated with relay 1B. Other pairs of first selectors 1S3 and 1S4 . . . 1S15 and 1S16 would have their RA and RB relays associated with relays 2A and 2B . . . 8A and 8B respectively in a similar manner.

It is necessary, when setting up a connection, to prepare the first selectors 1S1, 1S2 . . . 1S16, for subsequent operation of crosspoints relevant to certain available links between first and second selectors. In order, therefore, that the call may be directed from a transmission relay set, through the particular "A" or "B" outlet in the first selector, and the second selector in a particular sub-section, a set of marking-relays are provided. In the past, it has been customary to have a self-contained control circuit for each of the sixteen first-selectors 1S1 to 1S16. Only two control circuits are provided, since only two simultaneous calls can be set up over a section at any one time. One of these two controls is connected to the first selector which requires service at any particular time.

The marking relays comprise two relay chains of thirteen relays each, designated XA to XN and YA to YN respectively. For simplicity only relays XA, XB, XC, XL, XM and XN of the first chain and relays YA, YB and YN of the second chain are shown but it will be understood that the other relays will be similarly connected in the relay chains.

It may be taken that relays XA to XN are associated with marking wires of links ALKS extending to the ten second selectors 2SA1 to 2SA10 in sub-section "A" whereas those relays YA to YN are associated with marking wires of links BLKS extending to the ten second selectors 2SB1 to 2SB10 of sub-section B. The relays in both relay chains are operative on a one-at-a-time basis by markings received from either of the two sub-sections over marking wires associated with links ALKS or BLKS.

Each of relays XA to XN and YA to YN may be regarded as being associated with a particular outlet of all the first selectors, relays XA to XN being associated with "A" outlets and relays YA to YN being associated with "B" outlets. As an example, relays XA, XB and XC are associated with outlet 1, outlet 2 and outlet 3 respectively, each being "A" outlets, whereas relays YA, YB and YC are associated with outlet 3, outlet 4 and outlet 5 respectively and are "B" outlets. Other "A" and "B" outlets are allocated similarly as already described.

It will thus be evident that any one outlet can effectively be marked by operating a particular select and auxiliary magnet. For example, outlet 1 would be marked by operating select magnet 1T and auxiliary magnet 1M, whereas outlet 5 would be marked by operating select magnet 2T and auxiliary select magnet 2M. It is arranged, therefore, that two contacts from each relay of the 26 relays XA to XN and YA to YN, operate a select and auxiliary magnet together. These two contacts connect a resistance marking battery from resistance R1

(FIG. 5), through contacts of the marking relays by way of the marking wires M, to operate the select and auxiliary magnets, as mentioned above, of the first selector that has been made exclusively receptive to those markings by the operation of either relay RA or RB of that selector.

It is important to realise that due to the arrangement of first selector outlets, as previously described, contacts XN3 and XN4 or YN3 and YN4 will not be connected to all selectors. For example, considering the even pairs of selectors, these selectors do not use outlet 26 and, therefore, will not have contacts YN3 and YN4 connected to them. Odd pairs of selectors, which do not use outlet 25, will, therefore, not have contacts XN3 and XN4 connected to them.

The following tables show the select and auxiliary magnet operated and the outlet marked when a particular relay in one of two relay chains is operated:

| Relay operated | XA | XB | XC | XD | XE | XF | XG | XH | XJ | XK | XL | XM | XN |
|---|---|---|---|---|---|---|---|---|---|---|---|---|---|
| "A" outlet marked | 1 | 2 | 3 | 7 | 8 | 19 | 13 | 14 | 15 | 19 | 20 | 21 | 25 |
| Select magnet operated | 1T | 1T | 1T | 3T | 3T | 3T | 5T | 5T | 5T | 7T | 7T | 7T | 9T |
| Auxiliary magnet operated | 1M | 2M | 3M | 1M | 2M | 3M | 1M | 2M | 3M | 1M | 2M | 3M | 1M |
| **Relay operated** | **YA** | **YB** | **YC** | **YD** | **YE** | **YF** | **YG** | **YH** | **YJ** | **YK** | **YL** | **YM** | **YN** |
| "B" outlet marked | 4 | 5 | 6 | 10 | 11 | 12 | 16 | 17 | 18 | 22 | 23 | 24 | 26 |
| Select magnet operated | 2T | 2T | 2T | 4T | 4T | 4T | 6T | 6T | 6T | 8T | 8T | 8T | 9T |
| Auxiliary magnet operated | 1M | 2M | 3M | 1M | 2M | 3M | 1M | 2M | 3M | 1M | 2M | 3M | 2M |

It will be seen in the diagram that the marking-relay contacts mentioned above are common to all other first selectors 1S2 and 1S16 and would be effective in operating the appropriate select and auxiliary magnets in any first selector made exclusively receptive to markings as described above.

Although only one contact of relays XA to XN and YA to YN is shown connected in the marking wires M to the first selectors, it will be appreciated that where a common sign is shown, together with the relevant contact designations, there are three or more contacts connected in parallel.

Figure 6:
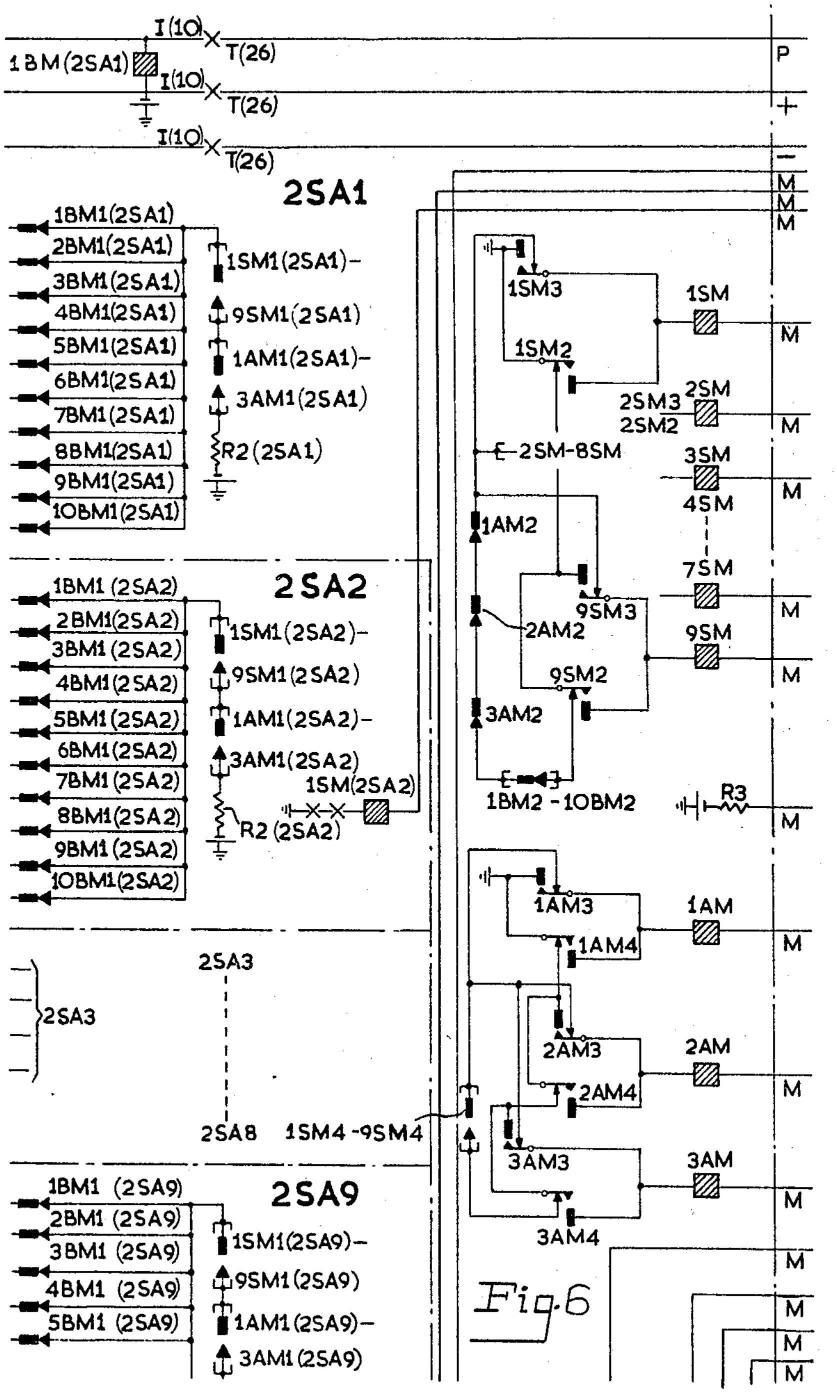
Figure 9:
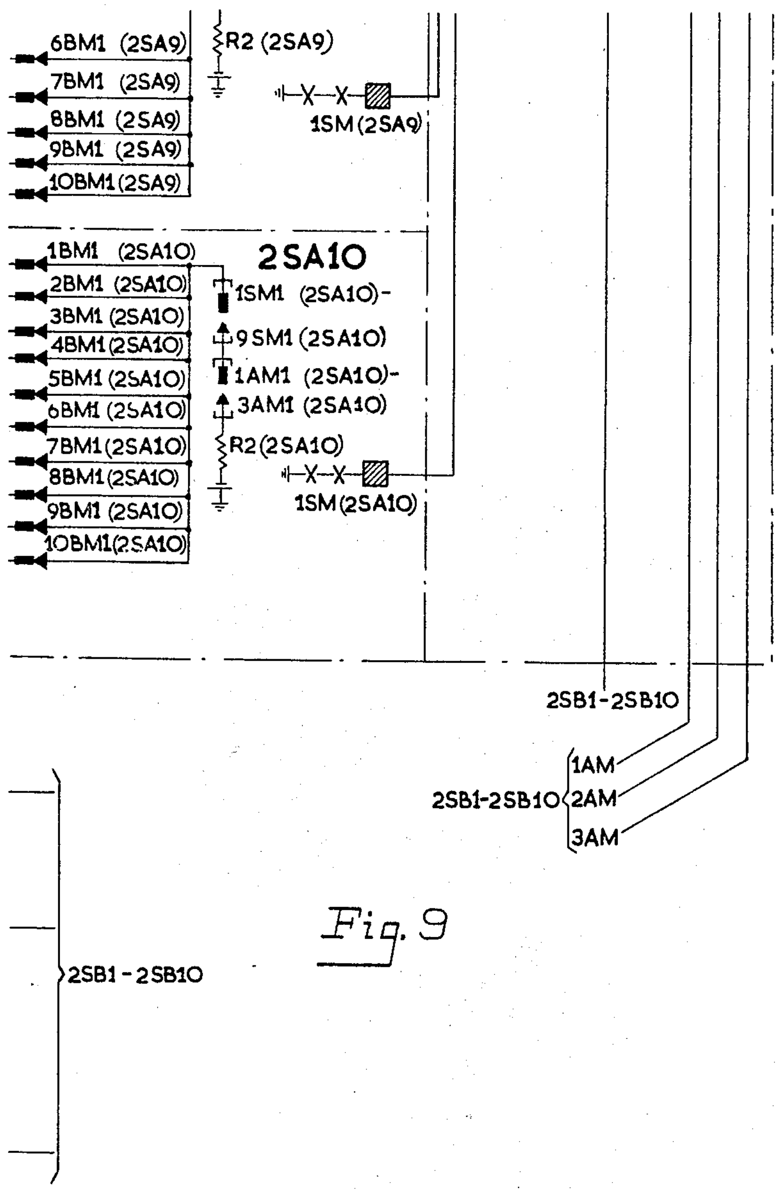

FIG. 6 and FIG. 9 show circuit portions appertaining to second selectors 2SA1 to 2SA10 and 2SB1 to 2SB10. Selector 2SA1 is shown in more detail than the others, select magnets 1SM to 9SM of the selector being chain-connected. The circuit connections for select magnet 1SM only is shown in this chain, but it may be taken that select magnets 2SM to 8SM are connected in a similar manner. Auxiliary magnets 1AM to 3AM are also connected in the form of a chain and in this instance all the circuit connections are shown. Both these chains operate on a one-at-a-time basis, i.e. only one magnet from each chain can be operated at any one time. The select and auxiliary magnets of other second selectors 2SA2 to 2SA10 and 2SB1 to 2SB10 are arranged in a manner similar to that described for second selector 2SA1. It will be understood that outlets 1 to 20 of selectors 2SA1 to 2SA10 are connected to terminating trunks of the divisions DIV1 to DIV20, the remaining six outlets being connected to outgoing junction lines. Outlets 1 to 20 are controlled by select magnets 1SM to 6SM in conjunction with auxiliary magnets 1AM to 3AM and select magnet 7SM in conjunction with auxiliary magnets 1AM and 2AM.

As regards to 100 marking wires associated with the 100 inlets (10 inlets per switch, 10 switches, 10×10=100) to the group of selectors 2SA1 to 2SA10, these may be considered as being connected by way of contacts of relays 1A to 8A to the thirteen relays XA to XN. The 100 marking wires are suitably connected to the thirteen relays so that eight marking wires are allocated to relay XA, eight to relay XB and so on up to relay XM, leaving four for relay XN. The connections are conveniently arranged so that the first eight marking wires connected to relay XA are associated with the first eight inlets of selector 2SA1. Eight more marking wires, which are connected to relay XB, are allocated; the first two from inlets 9 and 10 of selector 2SA1, the next six from inlets 1 to 60 of selector 2SA2. The next eight marking wires which are connected to relay XC are allocated so that four are associated with inlets 7 to 10 of selector 2SA2, and four more with inlets 1 to 4 of selector 2SA3. Allocation of the remaining marking wires to relays XD to XN would be in a similar manner, taking marking wires successively from selectors 2SA3 to 2SA10 respectively to make groups of eight. Relay XN is only allocated four marking wires as already described.

The ten marking-batteries, one from each second selector, extend from resistance R2 (FIG. 6) to the marking relays XA to XN by way of the operated contacts of auxiliary and select magnets. The auxiliary and select magnet contacts concerned are one of either 1AM1 to 3AM1 and 1SM1 to 9SM1 and although in the diagram only 1AM1 and 1SM1 are shown, it will be appreciated that 2AM1 and 3AM1 are connected in parallel with 1AM1 as are 2SM1 to 9SM1 with 1SM1. Each marking battery from the second selectors is allocated ten marking wires; in 2SA1 for example, eight would be terminated on relay XA of the marking-relays and the remaining two on relay XB. The marking battery from selector 2SA2 would mark six remaining wires of the group of eight extending to relay XB and four marking wires extending to relay XC. Other marking batteries from second selectors 2SA3 to 2SA10 are allocated to marking wires leaving the second-selectors in a similar manner as described for second-selectors 2SA1 to 2SA2.

Sub-section "B" circuitry and the operation of marking relays YA to YN is similar to that described for sub-section "A," and therefore, is not shown or described. However, a call passing through sub-section "B" would of course be directed to the "B" outlets of the first selectors 1S1 to 1S16.

Figure 7:
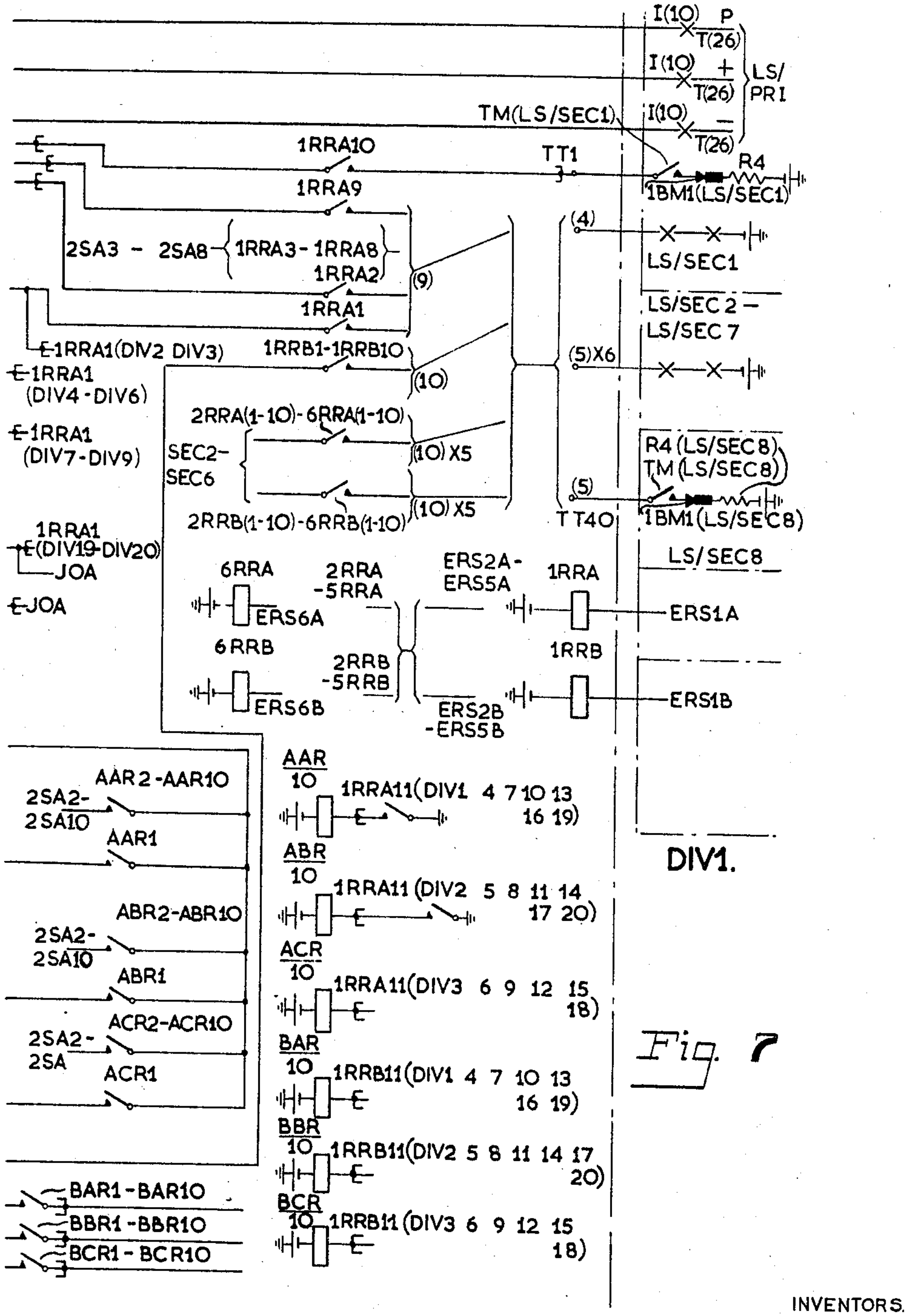

FIG. 7 shows portions of circuitry concerning the route marking relays described previously in connection with the trunking diagram of FIGS. 2 and 3. Also in FIG. 7 is shown portions of the circuit of the line-selectors secondary LS/SEC1 to LS/SEC8 of division DIV1. From these selectors resistance battery markings from resistance R4, appropriate to all free trunks are connected by way of the unoperated bridge contacts BM1, contacts of terminating call discriminating relay TM and route relays to operate certain select magnets in the second-selectors of the trunking section.

Referring again to the trunking diagram of FIGS. 2 and 3, it will be seen that the ten second selectors 2SA1 to 2SA10 of sub-section A each have 20 outlets for use on locally terminated calls, thus making a total of 200 outlets designated LOA. Similarly the ten second selectors 2SB1 to 2SB10 of sub-section B each have 20 outlets for use on locally terminated calls, again making a total of 200 outlets designated LOB. Ten LOA and ten LOB outlets from each of the six sections SECT1 to SECT6 are extended to the route relays relevant to each section. Ten LOA outlets from SECT1, for example, are connected to route relay 1RRA associated with division DIV1, and ten LOB outlets from SECT1 are connected to route relay 1RRB of division DIV1. The same ten LOA outlets and ten LOB outlets from section SECT2 are connected in a similar manner to route relays 2RRA and 2RRB of division DIV1. The remaining five pairs of relays of division DIV1 are connected to similar groups of ten outlets in other sections.

With regard to the remaining 190 LOA and 190 LOB outlets from section SECT1, these are distributed in groups of ten (ten from each group of 190) to divisions DIV2 and DIV20 in a similar manner as described for division DIV1, the 190 LOA and 190 LOB outlets from SECT2 to SECT6 are distributed similarly to those of SECT1. Considering the 200 outlets LOA of sub-section A, these are distributed among the 20 divisions DIV1 to DIV20 and since each selector has 20 outlets, it is convenient to allocate outlet 1 of each selector to division DIV1, outlet 2 to division DIV2 and so on. The same distribution applies to the outlets of selectors 2SB1 to 2SB10.

Now it still be seen from FIG. 1 that select magnet 1SM is relevant to outlets 1, 2, and 3, select magnet 2SM is relevant to outlets 4, 5 and 6 and so on. Therefore with the distribution of second selector outlets over the divisions as previously described, a connection to a terminating trunk of any of divisions DIV1 to DIV3 must involve the operation of select magnet 1SM in the second selectors 2SA1 to 2SA10, a connection to a terminating trunk of any of divisions DIV4 to DIV6 must involve the operation of select magnets 2SM in the second selectors 2SA1 to 2SA10 and so on. The same applies to second selectors 2SB1 to 2SB10.

As previously explained if a transmission relay group in section 1 is taken into use by a caller and it is decided that the connection is to be set up over subsection A of section 1, relay 1RRA in the division which includes the called subscriber will be operated and will extend the marking leads to the select magnets of the second selectors which are appropriate to the division. Thus if the division is any one of DIV1 to DIV3, the operation of relay 1RRA in any of the three divisions will control select magnet 1SM in all the second selectors 2SA1 to 2ST10. If the division is any one of DIV4 to DIV6, the operation of relay 1RRA in any of these divisions will control select magnet 2SM in all the second selectors.

However in order to complete conections between the inlets of the second selectors and an outlet to a particular division, an auxiliary magnet as well as a select magnet must be operated. Thus for division DIV1, select magnet 1SM and auxiliary magnet 1AM must be operated; for division DIV2, select magnet 1SM and auxiliary magnet 2AM must be operated; for division DIV3, select magnet 1SM and auxiliary magnet 3AM must be operated and so on. Thus auxiliary magnet 1AM is concerned with outlets to division DIV1, 4, 7, 10, 13, 16 and 19; auxiliary magnet 2AM with outlets to divisions DIV2, 5, 8, 11, 14, 17 and 20 and auxiliary magnet 3AM with outlets to divisions DIV3, 6, 9, 12, 15 and 18. Now the route relays are concerned with the control of the select magnets and it is therefore necessary to provide further relays for the control of the auxiliary magnets. These relays are AAR, ABR and ACR for sub-section A (selectors 2SA1–2SA10) and BAR, BBR and BCR for sub-section B (selectors 2SB1–2SB10). It will be understood that six similar relays will be provided for each trunk section and all the groups of six relays are common to all the divisions. Referring particularly to the relays shown in FIG. 7, relay AAR will be operated by the 11th contacts of route relay 1RRA in division DIV1, 4, 7, 10, 13, 16 and 19; relay ABR will be operated by the 11th contacts of route relay 1RRA in divisions DIV2, 5, 8, 11, 14, 17 and 20 and relay ACR will be operated by the 11th contacts of route relay 1RRA in divisions DIV3, 6, 9, 12, 15 and 18. Relays BAR, BBR and BCR will be operated by the 11th contacts of route relay 1RRB in the same divisions as set forth for relays AAR, ABR and ACR. It is important to note that while relays AAR, ABR, ACR, BAR, BBR and BCR are shown connected to the eleventh contacts of route relays 1RRA in divisions DIV1 to DIV20, they are also connected to the eleventh contacts of route relays 2RRA to 6RRA similarly to route relay 1RRA. It will be understood from the previous description that the contacts of relay AAR will control auxiliary magnets 1AM in each of the selectors 2SA1 to 2SA10; contacts of relay ABR will control auxiliary magnets 2AM in those selectors and contacts of relay ACR will control auxiliary magnets 3AM in those selectors. Relays BAR, BBR and BCR similarly control the auxiliary magnets in switches 2SB1 to 2SB10.

As an example, assume a caller is connected to a transmission relay set in section SECT1 and the dialled information in the register indicates that the called subscriber is in division DIV1. Entry relay set ERS1A or ERS1B in division DIV1 is brought into use by the register marking lead 1DA or 1DB, depending upon which section marking control is taken into use by one of either SMCA or SMCB. Assume that SMCA has been seized, in which case entry relay set ERS1A in division DIV1 is taken into use giving rise to the operation of route relay 1RRA. Contacts 1RRA1 to 1RRA10 extend battery markings to operate select magnet 1SM in all the second-selectors 2SA1 to 2SA10 to define outlets 1, 2 and 3. Contacts 1RRA11 of the route relay in division DIV1 would operate the appropriate relay AAR to finally define outlet 1 required out of the three outlets first defined by the operation of select magnet 1SM.

It will be appreciated, therefore, that connection of the eleventh contacts of the route relays to relays AAR, ABR or ACR are made in accordance with the outlet required i.e. the association between the route and select magnets 1AM, 2AM and 3AM respectively. Typically, marking from division DIV9, operates select magnet 3SM in all the secondary switches 2SA1 to 2SA10 defining outlets 7, 8 and 9, while contacts 1RRA11 of route relay 1RRA of division 9 operates relay ACR, the contacts of which operate 3AM in all the secondary selectors 2SA1 to 2SA10.

*Call to local exchange subscriber*

It will be assumed that a subscriber has completed a call origination and therefore has taken into use a transmission relay set and register, say TRS10 and 1REG1 respectively in section SECT1 of the exchange. Assuming also that the calling subscriber requires a subscriber served by division DIV1 and that all the digits defining the wanted subscriber are stored in the register, a call termination, or call to a local exchange subscriber, will now be considered in more detail.

The register takes either one of section marking control circuits SMCA and SMCB into use arbitrarily. The control circuit so taken into use thereupon grants permission for the procedure of marking the called subscriber's line circuit to commence.

Assuming that section marking control SMCA is concerned in the present call, the register is enabled to pass a sub-section "A" signal from section marking control SMCA, to the first-selector 1S1 upon which transmission relay set TRS10 is terminated. The "A" discriminating signal is effective in conditioning the particular first-selector alone to be eventually responsive to a backward marking potential received at one of its 1SOA outlets. The discriminating "A" signal from the register operates relay RA by way of lead ROA. Contacts RA1 operate relay 1A over lead RA and contacts RA4 to RA11 prepare the select and auxiliary magnets of 1S1 for operation from the contacts of relays XA to XN. The contacts of relay 1A prepare relays XA to XN for operation by backward markings from secondary selectors 2SA1 to 2SA10.

The register also applies a significant potential to that one of 20 common conductors DA corresponding to the division serving the called subscriber. Thus in the present case 1DA relevant to division DIV1 is marked. Three conductors (hundred, ten and unit digits) of the transfer path TPA, significant of the last three digits of the wanted subscriber's directory number, are also marked by the register. If the 500-line marker is idle, or when it becomes idle, the energised conductor 1DA seizes the marker entry relay set ERS1A. This prevents any remaining entry relay sets of the division being seized, operates the related route marking relay 1RRA, and extends the 25 conductor path TPA to the marker.

The route marking relay 1RRA, now completes the marking M wires of the links between ten of the 40 terminating trunks (division DIV1) and ten of the 200 second selector LOA outlets (sub-section "A") of the calling section SECT1.

The energised leads of the transfer path TPA operate relays within the marker which enables the subscriber's line circuit, if idle, to be marked with a potential by way of the incoming marking M lead. The marking potential is extended to the line-selector primary switch LS/PRI outlet to which the line circuit is connected, and exclusively operates the auxiliary and select magnets appropriate to that outlet. However, since this is a call termination the originating call discriminating relay is not operated so that the potential applied by the primary-selector to the discriminating conductors D of the ten links, remains appropriate to a call termination. The marking relay within the primary selector is also operated, and applies a potential to the marking conductor of all the ten primary/secondary links which are not already in use on established connections, operated bridge magnets signifying busy links.

In each line-selector secondary having but one link marked, the appropriate auxiliary magnet is operated. This permits the terminating-call discriminating relay TM of the selector to operate to the potential received over the discriminating lead of the link and moreover enables the select magnet appropriate to the link to be operated from the backward marking potential.

In each marked line-selector secondary, the operated terminating-call discriminating relay TM extends a resistance battery to each idle one of the five inlets of the selector (bridges 1 to 5), the idle inlets being signified by relevant unoperated bridge magnets. Thus the idle ones of the terminating trunks TT1 to TT40 are marked. Since the route marking relay 1RRA is operated, the marking wires M of the requisite ten trunks are extended to ten outlets LOA, by contacts 1RRA1 to 1RRA10.

Some or all of the ten (LOA) outlets are effectively marked by operation of select magnet 1SM and auxiliary magnet 1AM in all the second selectors 2SA1 to 2SA10, depending upon the number of free terminating trunks. For example in 2SA1, select magnet 1SM is operated by the extension of earth from contacts 1SM3, through contacts 1SM2 . . . 9SM3, 9SM2, parallel connected contacts 1BM2–10BM2, contacts 3AM2, 2AM2, 1AM2, 1SM3, magnet 1SM, contacts 1RRA1, contacts TM, 1BM1, resistance R4, to battery. The auxiliary magnet of selector 2SA1 is operated when relay AAR is operated by contact 1RRA11. Contacts AAR1 connect earth by way of 1AM3, 1AM4, 2AM3, 2AM4, 3AM3, 3AM4, 1SM4 to 9SM4, 1AM3, magnet 1AM to battery on resistance R3. Auxiliary magnets in switches 2SA2 to 2SA10 are operated also, but by contacts AAR2 to AAR10. It is important to note that auxiliary magnets can only operate if a select magnet is operated i.e. one of contacts 1SM4 to 9SM4 must be operated. Contacts 1AM2 prevent operation of any select magnets should backward markings be presented to selector 2SA1 at this stage.

In each of the marked (2SA1 to 2SA10) second selectors, a particular auxiliary magnet and select magnet appropriate to one marked terminating trunk is operated and therefore contacts 1AM1 and 1SM1 associated with R2 resistance battery are also operated. These contacts in each second-selector 2SA1 to 2SA10 extend resistance battery by way of unoperated bridge magnet contacts to contacts of relays 1A to 8A. It will be recalled that relay 1A was operated at an earlier stage and that the contacts 1A1 to 1A13 prepared relays XA to XN for operation. It is at this stage that one of these latter relays operates.

Earth is extended to the left hand side of each relay XA to XN from contacts XA2 by way of XA1, XB2, XB1 . . . XN2, XN1, through a break contact in the section marking control SMCA then through each break contact XA2 to XN2. The markings being terminated on relay XA to XN, will tend to operate these relays. However, if two or more are marked simultaneously only one will operate by virtue of their chain connection. Assuming relay XA to operate, the contacts XA3 and XA4 extend a resistance battery from resistance R1 through contacts RA4 and RA9 to operate seelct magnet 1T and auxiliary magnet 1M respectively in selector 1S1.

Contacts 1IT1 and 1IM1 of first selectors 1S1 to 1S16 extend resistance battery from resistance R through contacts RA3 to the section marking control SMCA to indicate that the marking function is complete. The section marking control SMCA in turn returns an earth by way of the register and transmission relay set to leads BB and P in selector 1S1. The break contact in the section marking control SMCA concerned with the relay chain XA to XN also operates at this juncture, the function of which will be explained later. Earth potential on lead BB operates the bridge magnet, in this instance bridge magnet 10. It is important to appreciate that if two calls involve transmission relay sets terminated on inlets of the same first selector the calls would be completed consecutively. Therefore, the return-signal earth operating bridge magnet 10 can only pass through one transmission relay set at a time i.e. TRS10, to operate one bridge magnet at any one time in the associated first-selector.

Bridge magnet 10 together with select and auxiliary magnets 1T and 1M respectively operate the associated crosspoints in the bridge, which extends the −, + and P wires from the transmission relay set, through the first-selector, to inlets of the second-selector. The earth on the P wire being extended over the particular link between the first and second-selectors operates the bridge magnet, say bridge magnet 1, in the secondary-selector associated with the inlet of the link concerned. Contacts 1BM1 of selector 2SA1 disconnect the circuit for relay XA which, therefore, releases. Relay XA and other relays in the chain relays XB to XN are prevented from operation at this stage to existing markings from other second-selectors when contacts XA1 and XA2 release, since the operated break contacts in section marking control SMCA prevents the earth from contacts XA2 being connected to the left-hand sides of relays XA to XN. Relay XA releasing at contacts XA3 and XA4 release select magnet 1T and auxiliary magnet 1M respectively in the first-selector.

The operated bridge magnet in the second-selector extends further the P wire through operated crosspoints to the inlets of the line-selectors secondary, where again the bridge magnet associated with the inlet, i.e. the terminating trunk, is operated. If, for example, bridge magnet 1 in the line-selector secondary is operated, contacts 1BM1 would remove the battery marking originally extended to operate select magnets 1SM in the second-selectors by way of the route relay contacts 1RRA1 to 1RRA10. Select magnets 1SM receiving the battery markings from the particular inlet whose bridge magnet is operated are, therefore, released. Contacts 1SM3 and 1SM2 released do not provide an operate circuit for other select magnets in the chain, should backward markings be presented to this selector, since contacts 1BM2 are operated preventing earth from contacts 1SM3 being connected to other select magnets. Auxiliary magnet 1AM is held operated until AAR releases at a later stage.

Operated crosspoints in the line-selector secondary extend still further the earth on the P wire to inlets of the line-selector primary switch whereupon the appropriate bridge magnet associated with the particular link operates. The crosspoints associated with the bridge, auxiliary and select magnets are operated which extend the —, + and P wires to the calling subscriber's line.

At this juncture, means are operative in the register to initiate the release of the register 1REG1, section marking control SMCA, entry relay set ERS1A, marker MKR, and route marking relay 1RRA. The release of the route relay releases all remaining operated select magnets in secondary selectors 2SA2 to 2SA10. Contacts 1RRA11 release relay AAR and contacts AAR1 to AAR10 release all auxiliary magnets 1AM in the second-selectors 2SA1 to 2SA10. The register in releasing passes a signal to the transmission relay set which causes (a) the — and + wires at the calling side of the connection to be diverted from the register to the calling speech-battery feeding relay of the transmission relay set, (b) the — and + wires at the called side of the connection to be diverted to a conventional source of ringing current in the relay set.

It will be recalled that bridge magnet 10 in selector 1S1 is operated by an earth from section marking control SMCA by way of the register and transmission relay set. The earth on the P wire is directed in a similar manner to hold bridge magnets of other selector stages. However, the release of the register and section marking control necessitates another source for these two earths and both are now originated from the transmission relay set. Bridge magnet 10 in selector 1S1 is held by way of the BA lead and contacts BM1, whereas bridge magnets of other selecting stages are held by way of the P wire. Release of the section marking control SMCA will release relay RA, contacts RA1 will release relay 1A. The call may then proceed in the normal manner i.e. the called party's bell is rung and so on.

It will be observed that in the circuit diagrams battery marking is used, this minimises earth fault liability i.e. misoperation of marking relays auxiliary magnets or select magnets.

It will be understood that while the invention has been illustrated as employing crossbar switches having 26 outlets, it is not limited thereto but is equally applicable to a system employing crossbar switcehs having a different number of outlets, for instance, to the crossbar switches having 28 outlets as described in Patent No. 3,156,780.

Further although the invention has been described as applied to the part of the exchange concerned with terminating local connections i.e. that part of the exchange between transmission relay groups and called subscribers' line circuits, it could equally well be adapted for use between transmission relay groups and outgoing junction lines and between calling subscribers' line circuits and transmission relay groups.

We claim:

1. In a telephone exchange arranged to operate on the self-steering principle, circuit arrangements for use in conjunction with two successive stages of crossbar selectors with each stage containing a plurality of selectors each of which has a plurality of inlets and plurality of outlets and the outlets of the first-stage selectors are link-connected to individual inlets of the second-stage selectors to provide at least one link between each first stage selector and each one of the second-stage selectors characterised in that relay means are provided for each first-stage selector contacts of said relay means, when operated, preparing possible operating paths for selecting magnets of the particular first-stage selector which are relevant to links to the second-stage selectors, other contacts of said relay means extending connections individually from marking leads, of those inlets of second-stage selectors which are linked to outlets of that first-stage selector associated with the operated relay means, to separate ones of a set of relays arranged for effective operation on a mutually exclusive basis depending on conditions appertaining at said marking leads each relay of said set being concerned with a particular corresponding outlet of every first-stage selector, any operated relay of the set serving to advance operating conditions towards selecting magnets of all first-stage selectors to enable the selecting magnets of that particular first-stage selector having an operated relay means to be so controlled as to perform a preparatory switching operation within the latter selector to determine which link is to be employed.

2. In a telephone exchange arranged to operate on the self-steering principle, circuit arrangements for use in conjunction with two successive stages of crossbar selectors of which the first-stage selectors each having speech-path relay sets separately connected to its inlets, are arranged in a plurality of pairs with corresponding outlets of the selectors of each pair connected together to provide common outlets which are divided into two groups, and of which the second-stage selectors are divided into two groups, the first group of common outlets of each pair of first-stage selectors being link-connected to individual inlets of the first group of second-stage selectors such as to provide at least one link between each pair of first-stage selectors and each one of said first group of second-stage selectors, the second group of common outlets of each pair of first-stage selectors being likewise link-connected to individual inlets of the second group of second-stage selectors, characterised in that each first selector has first and second discriminating relays individual to it and mutually-exclusively operable according to whether a connection is required to be set up from a speech-path relay set by way of any second-stage selector of said first group or said second group respectively, contacts of said first relay, when operated, preparing possible operating paths for those selecting magnets of the particular first-stage selector which are relevant to links terminating on second-stage selectors of the first group, whereas contacts of said second relay, when operated, prepare possible operating paths for those selecting magnets of the particular first-stage selector which are relevant to links terminating on second-stage selectors of the second group, the circuit arrangements also including an additional pair of relays for each pair of first selectors, the first relay of each additional pair being adapted to be operated upon operation of either of the first discriminating relays of the related pair of first selectors whereas the second relay of each additional pair is adapted to be operated upon operation of either of the second discriminating relays of the related pair of first selectors, the circuit arrangements moreover including first and second sets of relays, those of each set being arranged for effective operation on a mutually exclusive basis, the relays of the first set being individually concerned with those common outlets of all pairs of first selectors which are linked to inlets of the first group of second-stage selectors whereas the relays of the second set are individually concerned with those common outlets of all pairs of first selectors which are linked to inlets of the second group of second-stage selectors, any first relay of each said additional pairs of relays, upon operation, being adapted to prepare possible operate paths for individual relays of the first set from marking leads of the particular inlets, of the first group of second selectors, which are linked to the first group of common outlets of that pair of first-stage selectors associated with the operated first relay whereas any second relay of each said additional pair of relays is, upon operation, adapted to prepare possible paths for individual relays of the second set from marking leads of the particular inlets, of the second group of second selectors, which are linked to the second group of common outlets of that pair of first-stage selectors associated with the operated second relay, any operated relay of the first or second set serving to advance operating conditions towards selecting magnets of the first or second groups of outlets respectively of all first-stage selectors to enable the selecting magnets in that individual first-stage selector having an operated discriminating relay to be so controlled as to perform a preparatory switching operation within the latter selector to determine which link is to be employed.

References Cited by the Examiner

UNITED STATES PATENTS 3,242,265 3/1966 Benmussa et al. ------ 179—18

KATHLEEN H. CLAFFY, *Primary Examiner.*

WILLIAM C. COOPER, *Examiner.*